United States Patent [19]

Nakama

[11] Patent Number: 4,762,904
[45] Date of Patent: Aug. 9, 1988

[54] PLASTIC WINDOW GLASS HOLDER
[75] Inventor: Daiji Nakama, Yokohama, Japan
[73] Assignee: Nifco Inc., Yokohama, Japan
[21] Appl. No.: 17,362
[22] Filed: Feb. 24, 1987
[30] Foreign Application Priority Data Mar. 3, 1986 [JP] Japan .................. 61-29215[U]

[51] Int. Cl.⁴ .............................................. E05F 11/44
[52] U.S. Cl. ....................................... 428/122; 49/348; 52/823; 428/358
[58] Field of Search ................... 49/349, 490, 348; 52/823; 428/122, 358

[56] References Cited

U.S. PATENT DOCUMENTS

| | | | |
|---|---|---|---|
| 3,407,537 | 10/1968 | Urbanick | 49/490 X |
| 4,001,974 | 1/1977 | Wright | 49/490 X |
| 4,414,779 | 11/1983 | Ishii | 49/349 X |
| 4,477,507 | 10/1984 | Kunert | 428/122 X |
| 4,480,417 | 11/1984 | Evers | 52/823 X |
| 4,663,901 | 5/1987 | Ichinohe | 52/823 X |
| 4,668,556 | 5/1987 | Hermann et al. | 428/122 |

Primary Examiner—Henry F. Epstein
Attorney, Agent, or Firm—Trexler, Bushnell, Giangiorgi & Blackstone, Ltd.

[57] ABSTRACT

A window glass holder part with a window glass holding groove and a mounting leg part are formed integrally from a plastic material. The inner surfaces defining the holding grooves are formed with adhesive filling grooves facing each other on the opposite sides of the window glass and are open at one end to the outer surface of the holder and also with non-perpendicular prevention walls for preventing the upward displacement of the adhesive filling the adhesive filling grooves. The bottom of the holding groove is formed with a thin groove parallel to the holding groove to permit migration of the adhesive into the thin groove.

1 Claim, 3 Drawing Sheets

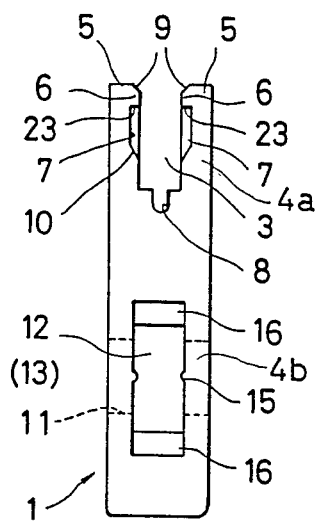
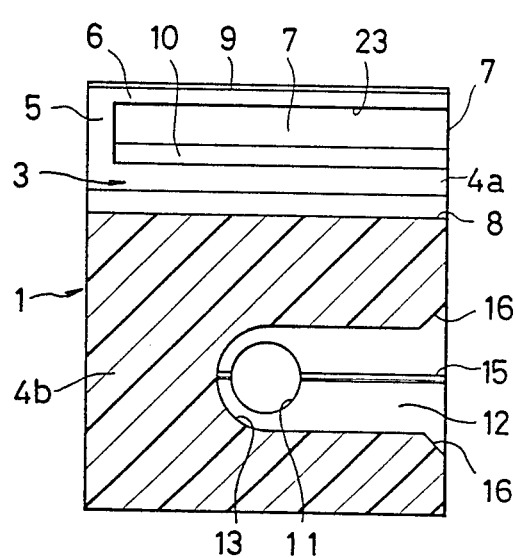
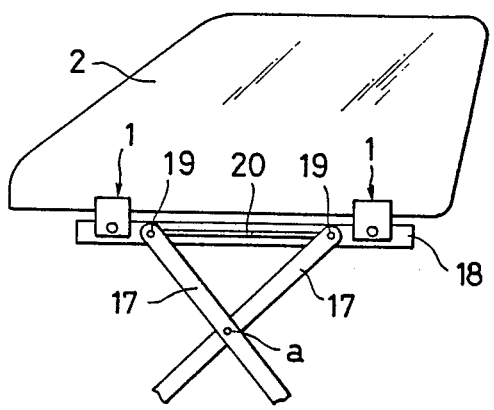
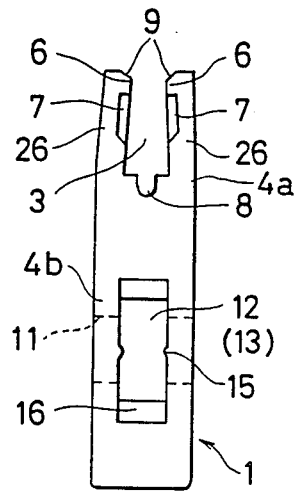

PLASTIC WINDOW GLASS HOLDER

FIELD OF THE INVENTION AND RELATED ART STATEMENT

This invention relates to a plastic window glass holder for mounting an automotive window glass on a mechanism for raising and lowering it.

FIGS. 1 and 2 show a window glass holder 42 which has heretofore been known. The holder 42 comprises a metal frame 39, which is obtained by bending a metal plate into a U-shaped form and has an elongate U-shaped form for receiving the lower end of the window glass 37 and a mounting piece 41 made of a metal plate and having a threaded hole 40 formed in a lower portion.

In this holder 42, the lower end of the window glass 37 is strongly forced into the U-shaped groove 38 and is held clamped by the elastic force of the frame 39 via a packing 43.

With the prior art holder 42, therefore, the frame 39 and mounting piece 41 have to be formed independently from metal plates and then welded together. Therefore, the manufacture is troublesome. In addition, it is very heavy in weight, so that it provides a great load on the raising/lowering mechanism and also increases the weight of the vehicle.

Further, when fitting the window glass 37 the packing 43 has to be inserted, so that the fitting of the window glass 37 is troublesome.

Further, since the window glass 37 is elastically clamped in the frame 39 via the packing 43, the window glass 37 is liable to be detached from the U-shaped groove 38.

OBJECT AND SUMMARY OF THE INVENTION

An object of the invention is to provide a window glass holder, which is light in weight, can be readily manufactured and can reliably hold the window glass.

According to the invention, there is provided a plastic automotive window glass holder, which comprises a window glass holding part with a window glass holding groove and a mounting leg part, these parts being formed integrally from a plastic material, the inner surfaces defining the holding grooves being formed with adhesive filling grooves facing each other on the opposite sides of the window glass and open at one end to the outer surface of the holder and also with non-perpendicular prevention walls for preventing the upward displacement of the adhesive filling the adhesive filling grooves, the bottom of the holding groove being formed with a thin groove parallel to the holding groove to permit migration of the adhesive into the thin groove.

Thus, according to the invention the lower end of the window glass is fitted in the holding groove of the holder and secured to the same by charging an adhesive into the adhesive filling grooves from the open end thereof, and then the mounting leg part is connected to a mechanism of raising and lowering the window glass.

Further, once the adhesive is hardened, even when a force is exerted to the window glass in a direction of detaching the same (i.e., in the direction of arrow A), the non-perpendicular prevention surfaces of the holding groove prevent the upward displacement of the adhesive hardened in the adhesive filling grooves, thus preventing the detachment of the window glass.

The above and other objects and features of the invention will become more apparent from the following detailed description with reference to the accompanying drawings.

BRIEF DESCRIPTION OF THE DRAWINGS

FIG. 5 is a side view showing a window glass holder of FIG. 3;

FIG. 6 is a transversal sectional view showing a window glass holder of FIG. 3;

FIG. 7 is a view showing a window glass holder of FIG. 3 holding a window glass;

FIG. 8 is a side view showing a second embodiment of the window glass holder according to the invention;

DETAILED DESCRIPTION OF THE PREFERRED EMBODIMENTS

Figure 1:
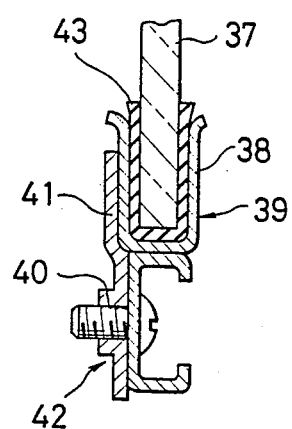
FIG. 1 is a sectional side view showing a prior art window glass holder holding a window glass.
Figure 2:
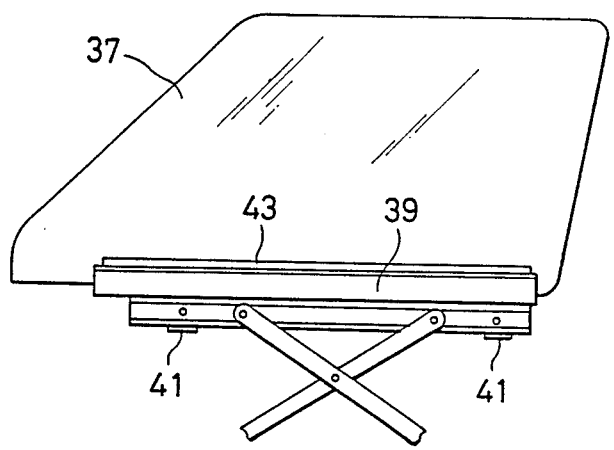
FIG. 2 is a view showing the prior art window glass holder in use.

FIGS. 3 to 7 show an embodiment of the window glass holder according to the invention. The window glass holder 1 consists of a window glass holding part 4a and a mounting leg part 4b. The holding part 4a which constitutes an upper portion has a holding groove 3 having a substantially U-shaped sectional profile open at the top and on the opposite sides. The lower end of the window glass 2 is fitted in the holding groove 3. The mounting leg part 4b extends from the lower end of the holding part 4a. The holding part and mounting leg part are formed integrally from a plastic material. The opposite side walls 5 forming the holding groove 3 have projecting edges 6 projecting from the inner wall surface and facing each other at a distance substantially equal to the thickness of the window glass 2. The inner wall surfaces of the opposite side walls 5 forming the holding groove 3 are also formed with respective, substantially channel-shaped grooves 7 facing each other on the opposite sides of the holding groove 3. Each groove 7 is formed on the inner side of the lower end of each projecting edge 6 and is open at one end sidewise to the outer surface of the holder 1. The bottom of the holding groove 3 is formed with a thin U-shaped groove 8 extending parallel to the groove 3. The upper end of the projecting edges 6 and the lower ends of the grooves 7 are formed with downwardly inclined surfaces 9 and 10.

The mounting leg part 4b has a circular through hole 11 formed in a substantially central portion. The part 4b also has a blind bore 12 formed from one end such that it crosses the hole 11. The bore 12 has a vertical dimension greater than the diameter of the hole 11. The bottom of the blind bore 12 has a nut mounting groove 13 having a semi-circular sectional profile. A nut 14 is inserted in the nut mounting groove 13. Further, a rib 15 is provided along the blind bore 12. To facilitate the insertion of the nut 14, an end portion of the blind bore 12 adjacent to the open end is formed with flaring surfaces 16 flaring toward the open end.

The mechanism for raising and lowering the window glass 2 will now be briefly described with reference to FIG. 7. The mechanism consists of a pair of movable arms 17 coupled together in an X-line form at an intersection point "a". A guide rail 18 is horizontally positioned on the upper ends of the movable arms 17. Guide pins 19 provided at the upper end of the movable arms 17 are fitted in a horizontally elongate guide hole 20 provided in a guide rail 18. The lower end of the guide rail 18 may be provided with a folded end section 21 for positioning, which is engaged on the lower end of the mounting leg part 4b.

Figure 3:
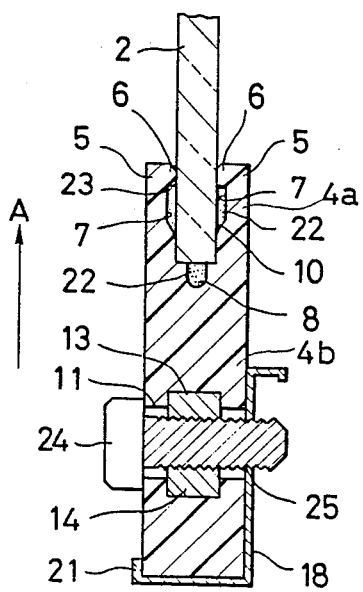
FIG. 3 is a sectional side view showing a first embodiment of the window glass holder according to the invention holding a window glass.
Figure 4:
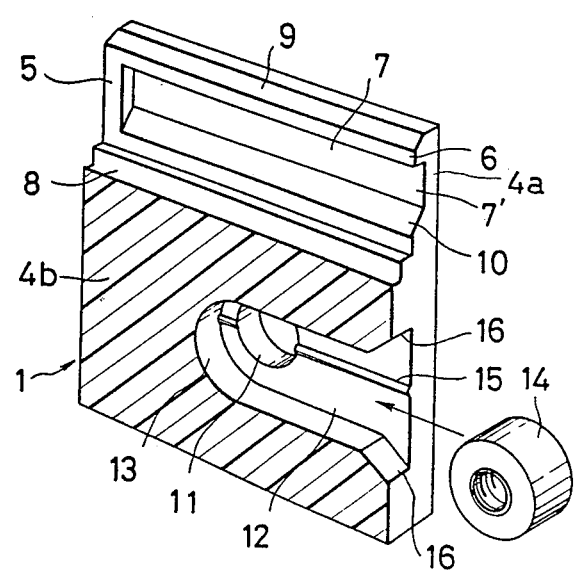
FIG. 4 is a partially cut-away exploded perspective view showing the window glass holder of FIG. 3.
Figure 9:
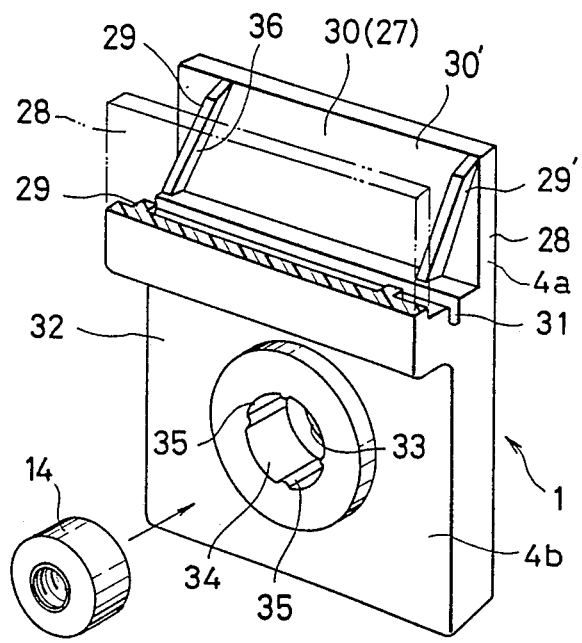
FIG. 9 is a partially cut-away exploded perspective view showing a third embodiment of the window glass holder according to the invention.
Figure 10:
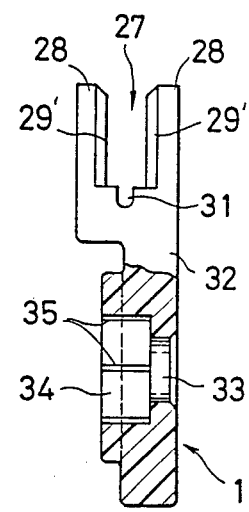
FIG. 10 is a partially cut-away side view showing a window glass holder of FIG. 9.
Figure 11:
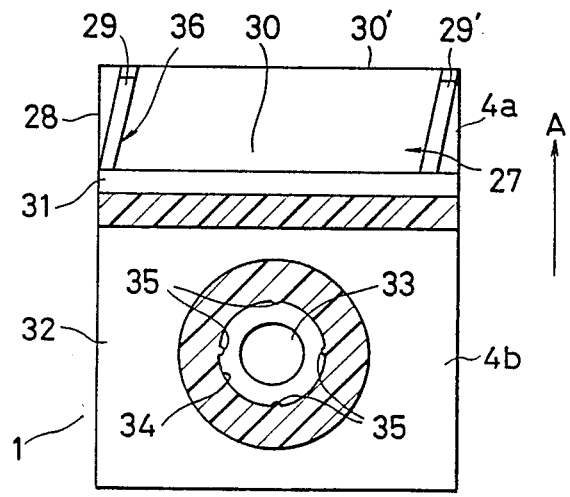
FIG. 11 is a transversal sectional view showing a window glass holder of FIG. 9.

To mount the window glass 2 in the holder 1, the holding groove 3 of each holder 1 is fitted upwards on the lower end of the window glass 2, and an adhesive 22 consisting of urethane is charged into the grooves 7 from open ends 7' thereof, whereby the holder 1 is secured to the window glass 2 (FIG. 3). The grooves 7 are surrounded by the projecting edges 6, the free end surfaces of which are in close contact with the front and back surfaces of the window glass 2. Therefore, the adhesive 22 will flow out past the projecting edges 6 to the outside of the groove 3. Part of the adhesive 22, however, migrates from the grooves 7 into the groove 8, and the adhesive hardens in the grooves 7 and 8.

When the adhesive 22 hardens in this way, the window glass 2 can no longer be detached from the holding groove 7. When a force is exerted on the window glass 2 in the direction of detaching it (i.e., in the direction of arrow A) in addition to the adhesive force of the adhesive 22, the adhesive 22 also tends to be displaced in the direction of arrow A. However, the inner surfaces 23 of the projecting edges 6 serve as prevention surfaces to prevent the upward displacement of the adhesive 22, thus resisting against the force tending to detach the window glass 2.

Then, the lower end of the mounting leg part 4b is fitted in the inner side of the folded end section 21. Then, a bolt 24 is inserted through a nut 14 in the nut mounting groove 13 and screwed through a threaded hole 25 formed in the guide rail 18. The holder is thus secured by tightening the bolts.

To raise or lower the window glass 2, one of the movable arms 17 is rotated about the intersection point "a" by a motor or by utilizing the torque of an operating handle (not shown). When the movable arm 17 is rotated, the guide pin 19 at its end is moved horizontally along the guide hole 20 of the guide rail 18. With the elongation and contraction of the movable arms 17 in the vertical directions, the window glass 2 secured to the guide rail 18 is moved vertically via the holder 1, thus opening or closing the window.

While in the above embodiment the adhesive 22 is charged only into the grooves 7, it is possible to charge the adhesive 22 into the groove 8 as well.

FIG. 8 shows a second embodiment of the holder according to the invention. In this instance, opposite walls 26 defining the holding groove 3 of the window glass holding part 4a are inwardly bent, so that the projecting edges 6 face each other at a distance smaller than the thickness of the window glass 2.

In this embodiment, when the window glass 2 is fitted in the holding groove 3, the projecting edges 6 are outwardly urged to outwardly displace the walls 26 away from each other. The free end surfaces of the projecting edges 6 can be elastically held in close contact with the front and back surfaces of the window glass 2, thus absorbing fluctuations in thickness of the window glass 2.

FIGS. 9 to 12 show a further embodiment of the holder according to the invention.

In this embodiment, the inner surfaces of the side walls 28 forming the holding groove 27 of the window glass holding part 4a are formed with parallel inclined projecting edges 29 and 29' facing each other at a distance substantially equal to the thickness of the window glass 2. Thus, substantially channel-shaped grooves 30 are formed between the opposite side projecting edges 29 such that they are open on the opposite sides of the holding groove 27 and open at the top to the outer surface of the holder 1. The bottom of the holding groove 27 is formed with a thin, substantially U-shaped groove 31 parallel to the holding groove 27. The mounting leg part 32 has a circular through hole 33 formed in a central portion. An annular groove 34 is formed about the hole 33 on one side of the mounting leg part 32. Radially spaced-apart ribs 35 are formed on the inner periphery of the annular groove 34. A nut 14 is fitted in the annular groove 34 from the open end thereof along the ribs 35.

Figure 12:
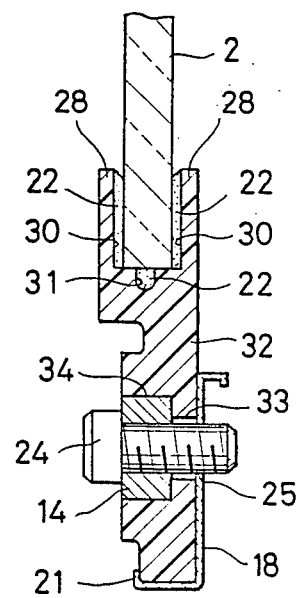
FIG. 12 is a sectional side view showing the window glass holder of FIG. 9 holding a window glass.

To mount the window glass 2, the holding groove 27 of each holder 1 is fitted upwards on the lower end of the window glass 2 and is then secured by charging adhesive 22 into the grooves 30 from the open top 30' (FIG. 12). Since the opposite ends of the grooves 7 are surrounded by the projecting edges 29 and 29' and the free end surfaces are in close contact with the front and back surfaces of the window glass 2, the adhesive 22 will not flow past the projecting edges 29 and 29' to the outside of the holding groove 27. However, part of the adhesive migrates from the grooves 30 into the groove 31, and the adhesive is hardened in the grooves 30 and 31.

When the adhesive 22 has hardened, the window glass 2 can no longer be detached from the holding groove 27. When a force is exerted to the window glass 2 in a direction tending to detach it (i.e., in the direction of arrow A), in addition to the adhesive force due to the adhesive 22, the adhesive 22 also tends to be upwardly displaced. However, the inclined inner surface 36 of one projecting edge 29 which is found obliquely upwardly, serves as a prevention surface, and thus prevents the upward displacement of the adhesive 22, thus resisting against the detaching force of the window glass 2.

As has been described in the foregoing, according to the invention it is possible to provide a plastic window glass holder, which is light in weight and can be readily manufactured.

Further, since the adhesive filling grooves are formed on the inner surfaces defining a holding groove for holding the window glass holding part, the window glass can be readily secured by subsequently charging the adhesive into the adhesive filling grooves. Further, the inner surface of the adhesive filling grooves is formed with a perpendicular prevention surface for effectively preventing the upward displacement of the adhesive, thus preventing the detachment of the window glass. Further, since the bottom of the holding groove is formed with a thin groove, the adhesive migrates into this thin groove, thus further improving the window glass bonding strength.

What is claimed is:

1. A plastic automotive window glass holder comprising a window glass holding part having a substantially U-shaped holding groove, in which the lower end of an automotive window glass is fitted, and a mounting leg part depending from the lower end of said window glass holding part and capable of being connected to a mechanism for raising and lowering a window glass, said window glass holding part and mounting leg part being formed integrally from a plastic material, the inner surfaces defining said holding grooves being formed with adhesive filling grooves facing each other on the opposite sides of the window glass and being open at one end to the outer surface of the holder and also with non-perpendicular prevention walls for preventing the upward displacement of the adhesive filling said adhesive filling grooves, the bottom of said holding groove being formed with a thin groove parallel to said holding groove to permit migration of the adhesive into said thin groove, said mounting leg part having two substantially parallel faces and including a recess opening at both of said faces, a nut member received in said recess, a guide rail disposed against at least one of said faces of said mounting leg part for cooperation with said raising and lowering mechanism, said guide rail having an aperture aligned with said recess, and a bolt threaded through said nut member and through said aperture to secure said holder to said guide rail.

* * * * *